(12) United States Patent
Hoffjann et al.

(10) Patent No.: US 8,141,185 B2
(45) Date of Patent: Mar. 27, 2012

(54) SELF-SUSTAINING WASHROOM FOR MOBILE USE

(75) Inventors: Claus Hoffjann, Hamburg (DE); Hansgeorg Schuldzig, Jork (DE); Heinz-Detlef Naeve, Muensterdorf (DE); Juergen Friedrich Haastert, Hamburg (DE)

(73) Assignee: Airbus Operations GmbH (DE)

( * ) Notice: Subject to any disclaimer, the term of this patent is extended or adjusted under 35 U.S.C. 154(b) by 959 days.

(21) Appl. No.: 11/899,627

(22) Filed: Sep. 5, 2007

(65) Prior Publication Data

US 2008/0127411 A1 Jun. 5, 2008

Related U.S. Application Data

(60) Provisional application No. 60/843,070, filed on Sep. 8, 2006.

(30) Foreign Application Priority Data

Sep. 8, 2006 (DE) .................. 10 2006 042 300

(51) Int. Cl.
*E03C 1/01* (2006.01)
(52) U.S. Cl. .................................. 4/664; 4/665

(58) Field of Classification Search ............... 4/664, 665
See application file for complete search history.

(56) References Cited

U.S. PATENT DOCUMENTS

| 6,296,957 | B1 * | 10/2001 | Graage ............................ 429/425 |
| 6,721,967 | B2 * | 4/2004 | Braxton ............................ 4/664 |
| 7,036,314 | B2 * | 5/2006 | Hoffjann et al. ............... 60/645 |
| 2002/0100682 | A1 * | 8/2002 | Kelley et al. .................. 204/266 |
| 2004/0038089 | A1 * | 2/2004 | Hoffjann et al. ............... 429/12 |
| 2004/0045910 | A1 * | 3/2004 | Hoffjann et al. ............. 210/758 |
| 2004/0060869 | A1 * | 4/2004 | Hoffjann et al. ............. 210/652 |
| 2006/0011525 | A1 * | 1/2006 | Hoffjann et al. ............. 210/136 |

FOREIGN PATENT DOCUMENTS

| DE | 20004353 U1 | 10/2000 |
| DE | 10142125 | 3/2003 |
| DE | 20122159 U | 6/2004 |
| WO | WO2005033023 | * 4/2005 |

* cited by examiner

*Primary Examiner* — Gregory Huson
*Assistant Examiner* — Karen L Younkins
(74) *Attorney, Agent, or Firm* — Lerner, David, Littenberg, Krumholz & Mentlik, LLP

(57) ABSTRACT

A sanitary device for autonomous operation for a conveyance. The sanitary device has a sanitary module and a supply system. The sanitary module is set up replaceably in a cabin area of the conveyance. The supply system is set up in the sanitary module to supply it. The sanitary module is autonomously operable.

20 Claims, 3 Drawing Sheets

SELF-SUSTAINING WASHROOM FOR MOBILE USE

CROSS-REFERENCE TO RELATED APPLICATIONS

This application claims the benefit of the filing date of U.S. Provisional Patent Application No. 60/843,070 filed Sep. 8, 2006, the disclosure of which is hereby incorporated herein by reference.

BACKGROUND OF THE INVENTION

The present invention relates to a sanitary device and a method for operating a sanitary device for a conveyance and the use of a sanitary device in a conveyance, as well as a conveyance having a sanitary device.

In modern conveyances, sanitary devices and/or washrooms are set up in the passenger cabins, which comprise self-contained cabins, or compartments. The sanitary devices are equipped, for example, with wash basins, toilets, or even shower stalls.

The water required for wash basins and toilet flushing is carried along in separate tanks, which are typically located outside the sanitary device.

The wastewater from the wash basins or the toilet apparatuses is, for example, collected and disposed of at specific service points provided for this purpose, for example, a railway station or an airport. For example, it is typical for aircraft to discharge the wastewater from wash basins directly outward into the environment via an outlet connecting part, the so-called drain mast. The wastewater is previously filtered and separated from coarse particles and contaminants. The wastewater is subsequently discharged to the environment.

The wastewater from the toilets is transported using a vacuum system into a feces collection container in aircraft. For this purpose, a pressure differential between the cabin pressure and the external pressure is exploited to convey the wastewater. Furthermore, a wastewater transport may also be performed using a vacuum pump which generates a partial vacuum.

Moreover, so-called recirculation toilets are also used, in which the wastewater is separated from the solids and the residual liquid is admixed with disinfectant. Subsequently, the wastewater thus treated may be used again for flushing toilet apparatuses.

In the two latter sanitary devices, the wastewater is removed from the containers at specific service points provided for this purpose, the containers remaining in the conveyance, such as an aircraft, a ship, a train, or a bus.

For example, all wastewater is introduced into a central wastewater container, which has the result that every sanitary device must be connected to this central wastewater tank using wastewater pipes. Furthermore, the possibility exists of pumping out the wastewater via external connections. Because of the fixed external connections or the complex pipe systems of the sanitary devices having central freshwater and wastewater containers, the mobility and/or the free positioning of the sanitary device in cabin spaces of conveyances is restricted. The ability to position the sanitary device within a cabin is fixed by the geometries predefined by the freshwater and wastewater system.

Especially in aircraft, particularly in transport aircraft having changing areas of use (MRT—multi-role transporter), a high flexibility is needed when designing interior furnishings of the cabins.

SUMMARY OF THE INVENTION

There may be a need to provide a sanitary device having high flexibility for a conveyance.

The need may be achieved by a sanitary device for a conveyance and a method for operating a sanitary device for a conveyance and the use of a sanitary device for operation in a conveyance and an aircraft having a sanitary device having the features according to the independent claims.

According to an exemplary embodiment of the present invention, a sanitary device for autonomous operation is provided for a conveyance. The sanitary device has a sanitary module and a supply system. The sanitary module is set up replaceably in a cabin area of the conveyance. The supply system is set up in the sanitary module, so that the sanitary module is operable autonomously.

According to a further exemplary embodiment of the present invention, a method for autonomous operation of a sanitary device for a conveyance is provided. A sanitary module is set up replaceably in a cabin area of the conveyance. The sanitary module is operated autonomously using a supply system set up in the sanitary module.

According to a further exemplary embodiment, the sanitary device described above is used in a conveyance.

According to a further exemplary embodiment, an aircraft is provided with the sanitary device described above.

The term "supply system" may be understood in the following as all apparatuses which are needed for operating a sanitary device. These may be understood to include, for example, all supply and disposal connections, containers, or other line systems. The term "freshwater" may be understood as water which has a high degree of purity up to drinking water quality. The term "wastewater" may be understood as water which has already been contaminated by the use of a washbasin element and/or a toilet element, for example, and may be contaminated with particles.

The term "cabin area" of the conveyance may be understood as the internal chamber of a conveyance, in which the passengers or the personnel are housed, for example. Furthermore, the cabin area may also form a cargo space.

An autonomously operable sanitary device is provided by the present invention, which may be flexibly installed and uninstalled in a cabin area of a conveyance, such as an aircraft. The sanitary device may be installed and uninstalled through pre-existing openings of the cabin area, such as a door of a cargo space hold. Therefore, the sanitary device may be completely assembled and tested before installation, i.e., before it is installed in a cabin area of a conveyance. The sanitary device has a sanitary module, in which a supply system having all supply units for operating the sanitary module is set up. Therefore, the sanitary module may be operated without supply connections or disposal connections leading outward. Complex external wastewater systems or freshwater systems are not needed. In addition, the autonomously operated sanitary module may be set up at arbitrary points of a cabin area, because the sanitary module is operable autonomously without permanently installed connections. "Autonomously" means that the sanitary device may be operated self-sufficiently and independently, without connections having to be provided externally. Therefore, a cabin layout may be altered rapidly and flexibly using the sanitary device, without further connections having to be laid or adapted. In addition, supply and disposal lines are unnecessary, so that weight and thus costs may be saved.

According to a further exemplary embodiment, the sanitary module has multiple wall elements, a ceiling element, and a floor element. The multiple wall elements, the ceiling element, and the floor element form a closed internal chamber. At least one of the multiple wall elements has a door area, so that the internal chamber is accessible to passengers. Because of the variable number of the wall elements, any geometry of the sanitary module may be implemented. For example, if three wall elements are used, an internal chamber having a triangular base area may be provided. An interior chamber having a polygonal area formed using multiple wall elements is also conceivable. Therefore, the shape of the sanitary module may be adapted flexibly to the particular geometric designs of the cabin areas, in which the sanitary device is to be installed. The ability to install a sanitary module is thus not restricted to specific cabin shapes.

According to a further exemplary embodiment, at least one of the multiple wall elements includes a cabin area. The internal chamber is formed by various wall elements, of which one wall element comprises a cabin element. The cabin element may, for example, comprise wall elements or a supporting structure of the cabin area of the conveyance and/or the accommodating internal chamber. The sanitary module to be installed may thus have an open side before the installation in a cabin area, the closed internal chamber being closed by the cabin element in addition to the wall elements. The cabin element may comprise a part of the wall of the cabin area. Therefore, the sanitary module may be tailored to flexible bulges or shapes of wall and/or of the cabin element of the cabin area. Because the cabin element forms the internal chamber with the multiple wall elements, at least one wall element may be dispensed with, so that weight and costs may be saved.

According to a further exemplary embodiment, the sanitary module has a washbasin element and a toilet element. The supply system has a freshwater container and a wastewater container. The freshwater container is set up to supply at least one of the washbasin elements and the toilet elements. The wastewater container is set up to receive wastewater from at least one of the washbasin elements and the toilet elements. Therefore, freshwater and/or drinking water may be taken from the freshwater container and provided to the washbasin element and the toilet element. Precisely for water from the washbasin element, the freshwater also has drinking water quality, because according to drinking water regulations, water which may come directly or indirectly into contact with human skin must correspond to drinking water quality. The used water of the washbasin element and the toilet element may be stored together in the wastewater container and removed therefrom. Therefore, it is no longer necessary to supply and dispose of the freshwater and the wastewater via central storage containers and pipeline systems, so that weight and costs may be saved. In addition, the sanitary module may be situated flexibly.

According to a further exemplary embodiment, the supply system also has a clear water container and a gray water container having a treatment unit. The gray water container is set up to receive the wastewater of the washbasin element and/or the gray water. The wastewater from the washbasin element which originates from the washbasin drain and overflow, for example, is also called gray water. The treatment unit is set up to treat the wastewater and/or gray water to produce clear water, the clear water container being set up to provide the clear water to the toilet element for flushing. It is not absolutely necessary to use freshwater for flushing the toilet element, because the water for toilet flushing is only used for transporting waste or feces and does not come into contact with the passenger. Therefore, it is sufficient to free the wastewater and/or gray water of the washbasin element from particles and other bad-smelling contaminants, for example, using the treatment unit and subsequently provide it to the toilet element for flushing. The treatment unit may have various particle filters and/or screens for filtering coarse particles and may additionally improve the color and/or the smell of the wastewater of the washbasin element using chemical substances or physical methods. Because of the multiple uses of the water which is carried along, on one hand in the washbasin element as freshwater, on the other hand in the toilet element as gray water and/or clear water, the quantity of water which is carried along may be reduced. Therefore, the storage demand for the water may be reduced, because of which installation space and therefore also costs are reducible.

The term "gray water" is understood, for example, as the wastewater of the washbasin element, a shower element, or a kitchen element. The gray water, in contrast to wastewater from toilet elements, for example, has no feces.

The term "clear water" is understood in the following as treated water which has been freed of coarse particles, unpleasant odors, and/or specific discolorations. Clear water is clear water free of particles and odors, the clear water not necessarily having to be sterile or drinking water. Treated and filtered gray water would be called clear water, for example.

According to a further exemplary embodiment, at least one of the freshwater container, the wastewater container, the clear water container, and the gray water container is set up replaceably in the sanitary module. For example, an empty freshwater container may thus be replaced by a full freshwater container. The operability of the sanitary module may thus be restored rapidly. On the other hand, a rapid replacement of the clear water container or the wastewater container is possible when these have been completely filled. In comparison to a filling procedure or a pumping procedure of the containers, the functional capability and the cleaning of the sanitary module may be restored rapidly via the replaceability.

According to a further exemplary embodiment, at least one of the freshwater container, the wastewater container, the gray water container, and the clear water container has conveyor elements. The conveyor elements may comprise rollers or rails, for example, by which the containers may be conveyed out of the cabin chamber easily. Complex lever mechanisms or the use of other prime movers are therefore unnecessary, because of which the replaceability of the containers may be simplified.

According to a further exemplary embodiment, the sanitary module also has an air inlet, the air inlet being set up in connection with a cabin ventilation apparatus. According to a further exemplary embodiment, the sanitary module also has an air outlet, the air outlet being set up in connection with a cabin ventilation. The air inlet and/or the air outlet are connected, for example, using a mechanical connection, such as pipelines, to a cabin ventilation apparatus. Furthermore, the air inlet and/or the air outlet may be operationally linked to the cabin ventilation apparatus, i.e., the air inlet and/or the air outlet may be operationally linked in an exhaust flow or a ventilation flow of the cabin ventilation apparatus or air conditioning apparatus, so that without additional apparatuses, such as pipe connections or ventilators, the air may be supplied or exhausted using the air flow. Using the air inlet and the air outlet, the possibility exists of introducing fresh air into the sanitary module, by which unpleasant odors may be reduced. If the air outlet is additionally set up in an area of the cabin ventilation apparatus, the air of the sanitary module may be conveyed outward rapidly. If the air outlet is set up in this area of the cabin ventilation apparatus, an air exchange from the cabin may be provided without connection elements, such as pipe connections, by exploiting the suction effect of the cabin ventilation apparatus. Therefore, air circulation may be provided in the sanitary module easily, so that unpleasant odors are reduced.

According to a further exemplary embodiment, the sanitary module has electrical consumer elements. The supply system also has a power supply unit. The power supply unit is set up to supply the electrical consumer elements with power. Because of the power supply unit, which is set up in the supply system, greatly varying consumer elements may be supplied with power, so that the sanitary module may be operated independently of an external power connection. Consumer elements may be selected from the group comprising lighting elements, hand drying devices, hair drying devices, comfort functions, information apparatuses, communication and data exchange devices, and controllers for system functions.

According to a further exemplary embodiment, the power supply unit has a fuel-cell system having an anode side and a cathode side. The cathode side may be supplied with cabin air and the anode side may be supplied with hydrogen. Therefore, an independent power supply unit may be provided using the fuel cell. Electrical energy may thus be provided inefficiently and autonomously for the consumer elements.

According to a further exemplary embodiment, the fuel-cell system has a low temperature fuel-cell. The low temperature fuel-cell may be a PEMFC (Proton Exchange Membrane Fuel Cell), for example. In this case, chemical energy is converted into electrical energy using hydrogen and oxygen. Normally, a solid polymer membrane, made of Nafion, for example, is used as the electrolyte. The membranes may be coated on both sides with a catalytically active electrode, a mixture of carbon (carbon black) and a catalyst, for example, frequently platinum or a mixture of platinum and ruthenium (PtRu electrodes). Hydrogen molecules disassociate on the anode side and are oxidized to protons by the delivery of two electrons. These protons diffuse through the membrane. On the cathode side, oxygen is reduced by the electrons, which may previously perform their electrical work. Water arises together with the protons transported through the electrolyte. To be able to exploit the electrical work, anode and cathode are connected to electrical conductor and the electrical consumer is connected between them. The waste heat level is approximately 40-80° C. To be able to achieve a technically relevant electrical voltage, multiple cells (from ten to several hundred) may be assembled into a so-called stack and multiple stacks may be operated in parallel. If a low temperature fuel cell is used, high operating temperatures of the fuel cell may be avoided.

According to a further exemplary embodiment, the supply system has a replaceable hydrogen tank. The replaceable hydrogen tank is set up to supply the fuel-cell system with hydrogen. Using the replaceable hydrogen tank, which is situated in the supply system, hydrogen may be provided to the fuel cell without conveying the hydrogen through long and complex hydrogen lines. The risk of escape of hydrogen is thus reduced. Because of the replaceability of the hydrogen tank, risky and time-consuming charging procedures may also be superfluous, because the hydrogen tank may be replaced rapidly.

According to a further exemplary embodiment, the hydrogen tank comprises a metal hydride accumulator, the metal hydride accumulator being chargeable with hydrogen. In a chargeable metal hydride accumulator, the hydrogen to be stored is stored in a metal or a metal alloy. Charging and discharging procedures in the metal hydride accumulator are sorption processes guided by pressure and temperature (P, T). A physical compound forms from the metal in the hydrogen, i.e., the metal hydride. Upon discharge of the metal hydride accumulator, the hydrogen is driven out again by desorption and using pressure reduction and/or decompression and by supplying heat, and provided to a consumer element. Upon charging of the metal hydride accumulator with hydrogen, the hydrogen is intercalated by adsorption using a pressure increase and/or compression and by dissipating heat. Hydrogen may thus be stored in the form of metal hydride without the hydrogen vaporizing or having to be cooled for storage.

According to a further exemplary embodiment, the supply system has a cooler element. The cooler element is set-up in heat-conductive contact with the metal hydride accumulator. In an operating state of the fuel-cell system, the metal hydride accumulator discharges hydrogen and simultaneously cools down. The metal hydride accumulator is set up to cool the cooler element. The term "heat-conductive contact" is understood as a contact and/or a connection, using which thermal energy may be transported. Heat-conductive contact may be provided using heat-conductive materials, such as copper, or using heat exchangers, for example. Because of the cooling of the metal hydride accumulator as a result of hydrogen discharge, it may absorb thermal energy and thus cool other elements such as the cooler element. Because of the use of this cooling, an energy balance may be improved and additional cooling assemblies may be entirely or partially dispensed with. Energy, weight, and costs may thus be saved.

According to a further exemplary embodiment, the cooler element is set up in heat-conductive contact with the fuel-cell system. The cooler element is thus set up to cool the fuel-cell system. Therefore, the fuel-cell system may be cooled without the use of additional cooling assemblies or other complex cooling systems. Weight and costs may thus be saved.

According to a further exemplary embodiment, the supply system also has a condenser. The condenser is set up to form a water condensate from exhaust air of the fuel-cell system. The condenser is set up in heat-conductive contact with the cooler element, the cooler element being set up to cool the condenser. A high proportion of water is located in the exhaust air of fuel-cell systems, which is removed from the fuel-cell system as water vapor and/or moisture-saturated exhaust air. Because of the cooling of the water vapor using the cooler element, the water contained in the water vapor condenses and may be captured in a container. The condensed water may subsequently be employed for further uses. Additional cooling assemblies may be dispensed with for cooling the exhaust air of the fuel-cell system using the cooler element. Furthermore, the water contained in the exhaust air may be condensed out and thus provided for further uses.

According to a further exemplary embodiment, the water condensate may be supplied to the freshwater container. Therefore, the freshwater container may additionally be filled with the water condensate, so that it may supply the sanitary module with freshwater over a longer period of time.

According to a further exemplary embodiment of the present invention, a hot water line is set up between the freshwater container and the washbasin element. The hot water line is set up in heat-conductive contact with the fuel-cell system, so that the freshwater is heatable using the fuel-cell system. Hot water may thus be provided to the washbasin element, without a heating element additionally having to be used. Therefore, energy and weight for additional heating devices may thus be saved.

According to a further exemplary embodiment, the power supply unit has a storage device for storing electrical energy. The storage device may, for example, comprise a battery or a capacitor. The possibility thus exists of temporarily storing the electrical energy generated and additionally providing this electrical energy in case of demand peaks, so that sufficient power may be provided.

According to a further exemplary embodiment, the power supply system is set up to feed electrical energy into a vehicle electrical system. The possibility thus exists of feeding excess energy into a vehicle electrical system of a conveyance. The vehicle electrical system of the conveyance is supplied with energy by the sanitary device. A vehicle electrical system is understood as the power network of a conveyance. Therefore, for example, during demand peaks or in case of emergency, the vehicle electrical system may be supplied with electrical energy and thus maintained.

According to a further exemplary embodiment, the supply system has a control unit, the control unit controlling energy distribution for the electrical consumer elements. Therefore, using the control unit, the energy demand of the consumer elements may be distributed and provided in a targeted way. For example, the various consumer elements may be supplied with electrical energy according to a predefined priority, so that, for example, in the event of a lack of energy, the lighting systems are supplied with energy first and only then the comfort systems, such as the electrical hand dryer. Energy distribution using the control unit may also be specified manually.

According to a further exemplary embodiment, the sanitary device may be set up in a conveyance selected from the group comprising aircraft, buses, rail vehicles, and water vehicles. The sanitary device may be set up pre-mounted in the cabin area of the conveyance and installed flexibly and independently at various positions. External connections are superfluous, so that a cabin layout may be set up flexibly. Furthermore, the possibility exists of uninstalling the sanitary device from the conveyance as a whole. The sanitary device may also be used outside conveyances because of its autonomous system. Precisely in military applications, the possibility exists of uninstalling the sanitary devices and thus also using them as field sanitary devices.

The embodiments of the device also apply for the method and for the conveyance as well as for the use and vice versa.

BRIEF DESCRIPTION OF THE DRAWINGS

In the following, exemplary embodiments are described in greater detail with reference to the attached drawings for further explanation and better understanding of the present invention.

DETAILED DESCRIPTION

Figure 1:
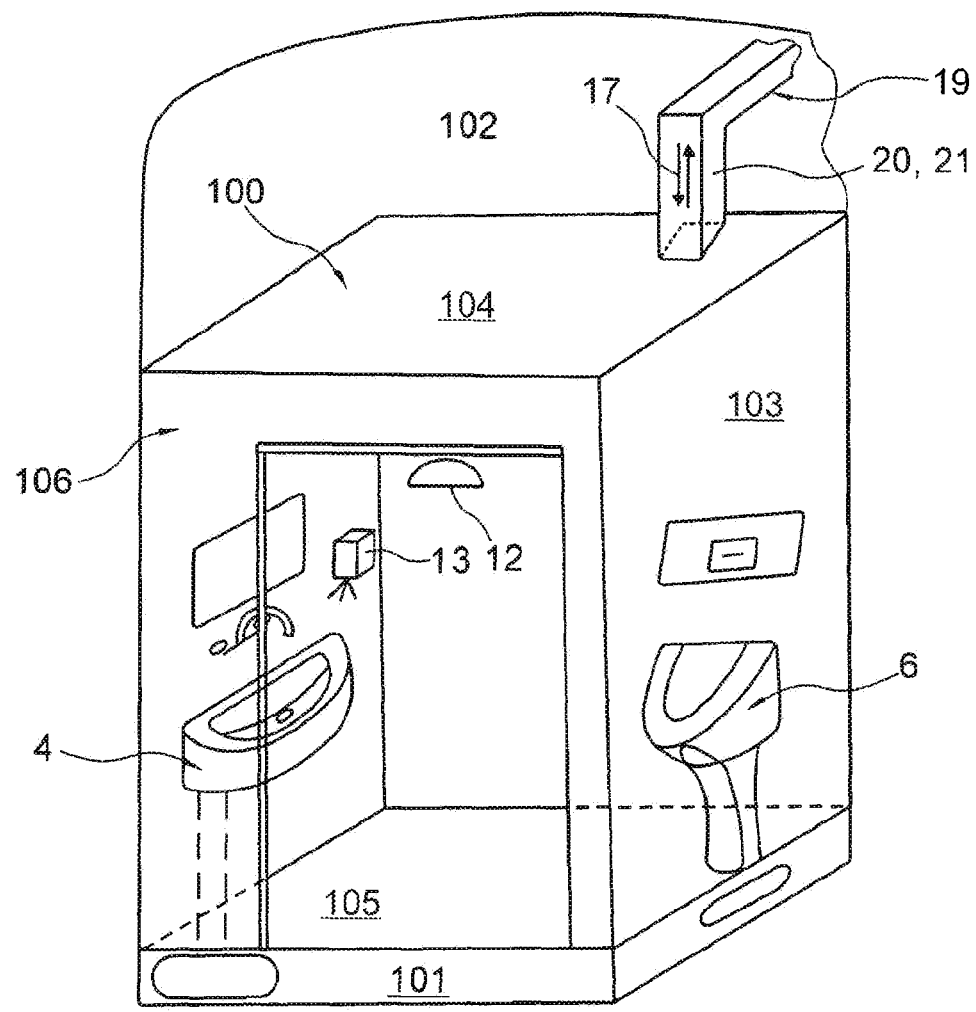
FIG. 1 shows a schematic illustration of a sanitary device according to an exemplary embodiment.

Identical or similar components in different figures are provided with identical reference numerals. The illustrations in the figures are schematic and are not to scale.

Figure 2:
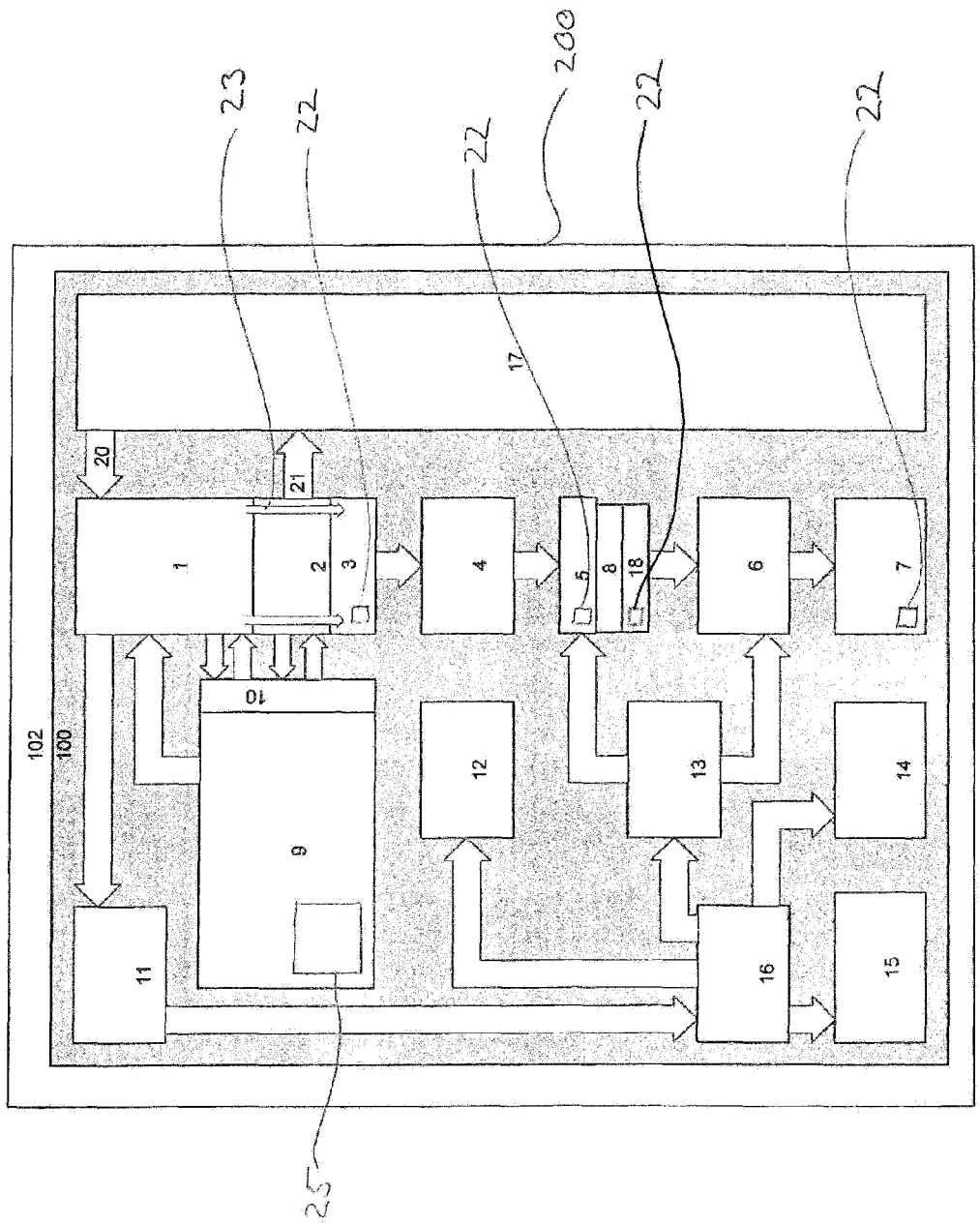
FIG. 2 shows a schematic illustration of an exemplary embodiment of a sanitary module having various elements of the supply system.
Figure 3:
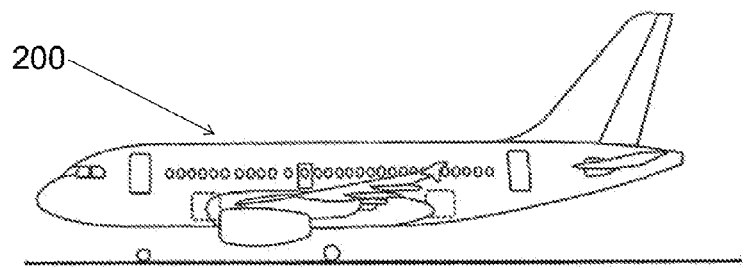
FIG. 3 shows an aircraft according to an illustrative embodiment of the present invention.

FIG. 1 shows an exemplary embodiment of the sanitary device for autonomous operation for an aircraft 200 (see FIGS. 2-3). The sanitary device has a sanitary module 100 and a supply system 101. The sanitary module 100 is set up replaceably in a cabin area 102. The supply system 101 is set up in the sanitary module 100 in such a way that the sanitary module 100 is operable autonomously. External supply and disposal connections are unnecessary, so that the sanitary module 100 may be installed flexibly in the cabin area 102. For example, the elements of the supply system 101 may be situated in the floor area of the sanitary module 100. The sanitary module 100 additionally has multiple wall elements 103. The multiple wall elements 103, a ceiling element 104, and a floor element 105 form an internal chamber, at least one of the multiple wall elements 103 having a door area for traversing the internal chamber. Furthermore, the sanitary module 100 may be open on one side, for example, and form a closed internal chamber via a cabin area 102 and/or a cabin element 106. Therefore, one panel part and/or wall element 103 may be saved and weight may be reduced. Furthermore, the sanitary module 100 may be tailored to greatly varying shapes of the cabin area 102.

Furthermore, FIG. 1 shows that a washbasin element 4 and a toilet element 6 are set up in the sanitary module 100. Furthermore, shower elements or further sanitary apparatuses may additionally be set up in the sanitary module 100. The supply system 101 has a freshwater container 3 and a wastewater container 7. The freshwater container 3 may supply the washbasin element 4 and/or the toilet element 6 with freshwater via a hot water line. The used water of the washbasin element 4 and the toilet element 6 may be received by the wastewater container 7.

FIG. 2 shows an exemplary schematic configuration of various functional elements in the sanitary module 100. The supply system 101 may also have a gray water container 5 having a treatment unit 8 between the washbasin element 4 and the toilet element 6. The gray water container 5 may receive gray water and/or used water of the washbasin element 4. The treatment unit 8 may free this gray water of coarse dirt particles, unpleasant odors, or discolorations and thus provide clear water from the gray water. The clear water may be stored in a clear water container 18. This clear water may be provided to the toilet element 6 for flushing, for example. Clear water does not come into contact with individuals, for example, so that it does not have to have drinking water quality. Therefore, water which has already been used may be employed as clear water for further purposes and thus the overall demand for water may be reduced.

The individual functional modules, such as the freshwater container 3, the wastewater container 7, the clear water container 18, and/or the gray water container 5 may be set up replaceably in the sanitary module 101. In addition, the individual containers 3; 5; 7 may have rollers 22 to thus be replaced rapidly and be uninstalled and/or installed from or to the cabin area 102 using the rollers. The sanitary module 100 may also have a ventilation apparatus 19 including an air inlet 20 and an air outlet 21, so that air circulation may be provided continuously in the sanitary device. The air outlet 21 may be set up in proximity to a cabin exhaust, to thus exchange the air of the sanitary module 100. The sanitary device 100 is connected to the cabin air 17 in such a way that a free air feed 20 and a free air outlet 21 are provided. If the air outlet 21 is positioned in proximity to a climate control unit having a suction apparatus, the cabin air 17 may thus be exhausted, i.e., into the external environment of the cabin area 102.

The supply system 101 may also have a power supply apparatus 1. The power supply apparatus 1 may provide power to various electrical consumers of the sanitary module 100 or the cabin area 102. Power may thus be provided for electrical controllers 16, communication elements 15, or a lighting system 12 or various system functions 13, such as a hairdryer or an electrical hand dryer.

The electrical energy may also be generated using a fuel-cell system 1. The fuel-cell system 1 may particularly comprise a low temperature fuel-cell, in particular of the PEMFC (Proton Exchange Membrane Fuel Cell) type. Cabin air 17 from the surroundings of the system is fed to the fuel-cell system 1 on the cathode side and hydrogen, for example, from a hydrogen tank 9, is fed on the anode side. The hydrogen tank 9 may be situated replaceably inside the supply system 101.

The hydrogen tank 9 may also comprise a replaceable metal hydride accumulator 25. The metal hydride accumulator 25 may be filled with hydrogen outside the cabin area 102 and may discharge hydrogen to the fuel-cell system 1 inside the cabin area 102.

Upon discharge of the metal hydride accumulator 25, it cools down and may thus absorb thermal energy of a cooler element 10, which is situated in the supply system 101. The cooler element 10 is set up in heat-conductive contact with the fuel-cell system 1 or a condenser 2. Therefore, the cooler element 10 may cool the fuel-cell system 1 or the condenser 2. The condenser 2 thus cooled may condense the water contained therein from the moist exhaust air of the fuel-cell system 1. High proportions of evaporated water, which condenses out via cooling and may be fed to the freshwater container 3, are contained in the exhaust air of the fuel-cell system 1. Therefore, freshwater 23 may be obtained, which fills the freshwater tank 3, by which the operational capability of the sanitary device may be lengthened.

The electrical power provided by the fuel cell 1 is provided directly or using a transducer 11, for example, for other electrical consumer elements. A control unit 16 may distribute the electrical power to various lighting bodies 12, communication and data exchange devices 15, controllers for system functions 13, comfort functions, such as electrical hand dryers or hair dryers, or information apparatuses. In addition, storage devices 14, such as batteries or capacitors, may be charged. In a special configuration, electrical energy may be provided additionally or also exclusively by feeding it into a vehicle electrical system of the cabin area 102.

Moreover, it is to be noted that "comprising" does not exclude other elements or steps and "one" or "a" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS

1 fuel-cell system
2 condenser
3 freshwater container
4 washbasin element
5 gray water container
6 toilet element
7 wastewater container
8 treatment unit
9 hydrogen tank
10 cooler element
11 voltage rectifier
12 lighting system
13 system functions
14 storage element
15 communication element
16 control unit
17 cabin air
18 clear water container
19 ventilation apparatus
20 air inlet
21 air outlet
22 conveyor element
25 metal hydride accumulator
50 treatment unit
100 sanitary module
101 supply system
102 cabin area
103 wall element
104 ceiling element
105 floor element
106 cabin element
200 aircraft

The invention claimed is:

1. A sanitary device for a conveyance, comprising:
a sanitary module;
a supply system;
wherein the sanitary module is adapted for being set up replaceably in a cabin area of the conveyance; and
the supply system is set up in the sanitary module, so that the sanitary module is operable autonomously;
wherein the sanitary module has electrical consumer elements;
the supply system also has a power supply unit;
the power supply unit is set up to supply the electrical consumer elements with power;
wherein the power supply unit has a fuel-cell system having an anode side and a cathode side and a hydrogen tank with a metal hydride accumulator chargeable with hydrogen;
wherein cabin air may be fed to the cathode side and hydrogen may be fed to the anode side from the hydrogen tank;
wherein the supply system has a cooler element;
wherein the cooler element is set up in heat-conductive contact with the metal hydride accumulator;
wherein the metal hydride accumulator discharges hydrogen and cools down in an operating state of the fuel-cell system; and
wherein the metal hydride accumulator is set up to cool the cooler element.

2. The sanitary device of claim 1,
wherein the sanitary module has multiple wall elements, a ceiling element, and a floor element;
the multiple wall elements, the ceiling element, and the floor element form an internal chamber; and
at least one of the multiple wall elements has a door area.

3. The sanitary device of claim 2,
wherein at least one of the multiple wall elements comprises a cabin element of the cabin area.

4. The sanitary device of claim 1,
wherein the sanitary module has a washbasin element and a toilet element;
the supply system has a freshwater container and a wastewater container;
the freshwater container is set up to supply at least one of the washbasin element and the toilet element; and
the wastewater container is set up to receive wastewater from at least one of the washbasin element and the toilet element.

5. The sanitary device of claim 4,
wherein the supply system also has a clear water container and a gray water container having a treatment unit;
the gray water container is set up to receive wastewater of the washbasin element;
the treatment unit is set up to treat the wastewater to form clear water and feed it to the clear water container; and
the clear water container is set up to provide the clear water to the toilet element for flushing.

6. The sanitary device of claim 5,
wherein at least one of the freshwater container, the wastewater container, the clear water container, and the gray water container is set up replaceably in the sanitary module.

7. The sanitary device of claim 6,
wherein at least one of the freshwater container, the wastewater container, the clear water container, and the gray water container has conveyor elements.

8. The sanitary device of claim 1,
wherein the fuel-cell system has a low temperature fuel cell.

9. The sanitary device of claim 1,
wherein the supply system has a replaceable hydrogen tank.

10. The sanitary device of claim 1,
wherein the cooler element is set up in heat-conductive contact with the fuel-cell system; and
wherein the cooler element is set up to cool the fuel-cell system.

11. The sanitary device of claim 1,
wherein the supply system has a condenser;
the condenser is set up to produce a water condensate from exhaust air of the fuel-cell system;
the condenser is set up in heat-conductive contact with the cooler element; and
the cooler element is set up to cool the condenser.

12. The sanitary device of claim 11,
wherein the water condensate may be supplied to a freshwater container.

13. The sanitary device of claim 1,
wherein the power supply system has a storage device for storing electrical energy.

14. The sanitary device of claim 1,
wherein the power supply system is set up to feed electrical energy into a vehicle electrical system.

15. The sanitary device of claim 1,
wherein the supply system also has a control unit; and
the control unit controls power distribution for the electrical consumer elements.

16. A method for autonomous operation of a sanitary device for a conveyance comprising:
replaceably setting up of a sanitary module in a cabin area of the conveyance; and
autonomously operating of the sanitary module using a supply system set up in the sanitary module;
supplying electrical consumer elements of the sanitary module with power, wherein the power is supplied with a power supply unit of a power supply system of the sanitary device;
feeding cabin air to a cathode side of a fuel-cell system of the power supply unit and hydrogen to an anode side of the fuel-cell system from a hydrogen tank of the power supply unit, wherein the hydrogen tank has a metal hydride accumulator chargeable with hydrogen;
discharging hydrogen from the metal hydride accumulator and cooling down the metal hydride accumulator in an operating state of the fuel-cell system;
cooling a cooler element of the supply system with the metal hydride accumulator.

17. The method of claim 16,
wherein the conveyance is selected from the group comprising aircraft, buses, rail vehicles, or water vehicles.

18. An aircraft having a sanitary device of claim 1.

19. A method for autonomous operation of a sanitary device for a conveyance, comprising using a sanitary device according to claim 1.

20. A sanitary device for a conveyance, comprising:
a sanitary module;
a supply system having a power supply unit;
wherein the sanitary module is adapted for being set up replaceably in a cabin area of the conveyance; and the supply system is set up in the sanitary module, so that the sanitary module is operable autonomously;
wherein the power supply unit has a fuel-cell system having an anode side and a cathode side and a hydrogen tank with a metal hydride accumulator chargeable with hydrogen;
wherein cabin air may be fed to the cathode side and hydrogen may be fed to the anode side from the hydrogen tank;
wherein the supply system has a cooler element;
wherein the cooler element is set up in heat-conductive contact with the metal hydride accumulator;
wherein the metal hydride accumulator discharges hydrogen and cools down in an operating state of the fuel-cell system; and
wherein the metal hydride accumulator is set up to cool the cooler element.

* * * * *